April 3, 1951. W. L. McGRATH 2,547,879
AIR CONDITIONING CONTROL ARRANGEMENT
Filed June 28, 1944 2 Sheets-Sheet 1

INVENTOR
William L. McGrath
BY
ATTORNEY.

April 3, 1951 W. L. McGRATH 2,547,879
AIR CONDITIONING CONTROL ARRANGEMENT
Filed June 28, 1944 2 Sheets-Sheet 2

INVENTOR.
William L. McGrath
BY Herman Reid
ATTORNEY.

Patented Apr. 3, 1951

2,547,879

UNITED STATES PATENT OFFICE 2,547,879

AIR-CONDITIONING CONTROL ARRANGEMENT

William L. McGrath, Syracuse, N. Y., assignor to Carrier Corporation, Syracuse, N. Y., a corporation of Delaware Application June 28, 1944, Serial No. 542,553

14 Claims. (Cl. 236—1)

1

This invention relates to a control valve arrangement and more particularly to a simple and effective means for governing the rate of flow of cooling or heating fluids used for conditioning air under summer and winter operating conditions.

The principal object of the invention is to provide a self-contained control unit operative responsive to changes in load conditions under summer, winter and intermediate season operating conditions for regulating the flow of fluid of any desired character to a coil adapted as desired to heat or cool air serving a conditioned enclosure.

Another object of the invention resides in the provision of a temperature control arrangement for regulating any heating and cooling action where the temperature changing medium may be alternately above or below the temperature of a conditioned enclosure effected by the temperature of said medium.

A feature of the invention resides in the provision of a valve casing in which a plurality of bellows are provided adapted to expand and contract to control the movement of a lever in opposition to pressure exerted by a spring or equivalent means against the lever.

Another feature of the invention resides in the provision of a pair of bellows actuated members served by a pair of thermal temperature responsive bulbs, each of the bellows being adapted to influence the action of a lever for governing the position of a valve member arranged to regulate the flow of liquid or fluid through the valve.

Another feature of the invention resides in the provision of a free floating lever which is biased in one direction by a seal-off bellows and adjustment spring and biased in the opposite direction by two vapor filled thermal systems which terminate in bellows as aforesaid engaging the lever.

A further feature resides in the operation of a valve for regulating the flow of heating or cooling fluid, said valve being controlled responsive to changes in temperature affecting a pair of thermal responsive bulbs located in a conditioned room, in such manner that the valve opens in response to a rise in room temperature when the fluid temperature is below room temperature, and closes on a rise in room temperature when the fluid temperature is above room temperature.

Another feature resides in the provision of a valve in which a plurality of control bellows are housed, such bellows being in the path of fluid flow through the valve so that sensitive response in determining the direction of valve motion is provided as the character of the fluid supplied to the valve is changed.

Another feature resides in the provision of a first "gas charged" thermal system together with a second "heavy fill" thermal system, both systems terminating in bellows engaging a lever employed for metering hot and cold liquid employed for air conditioning under winter and summer conditions.

These and other features will be more apparent from the following description of an illustrative embodiment of the invention to be read in connection with the accompanying drawings in which.

Figure 1:
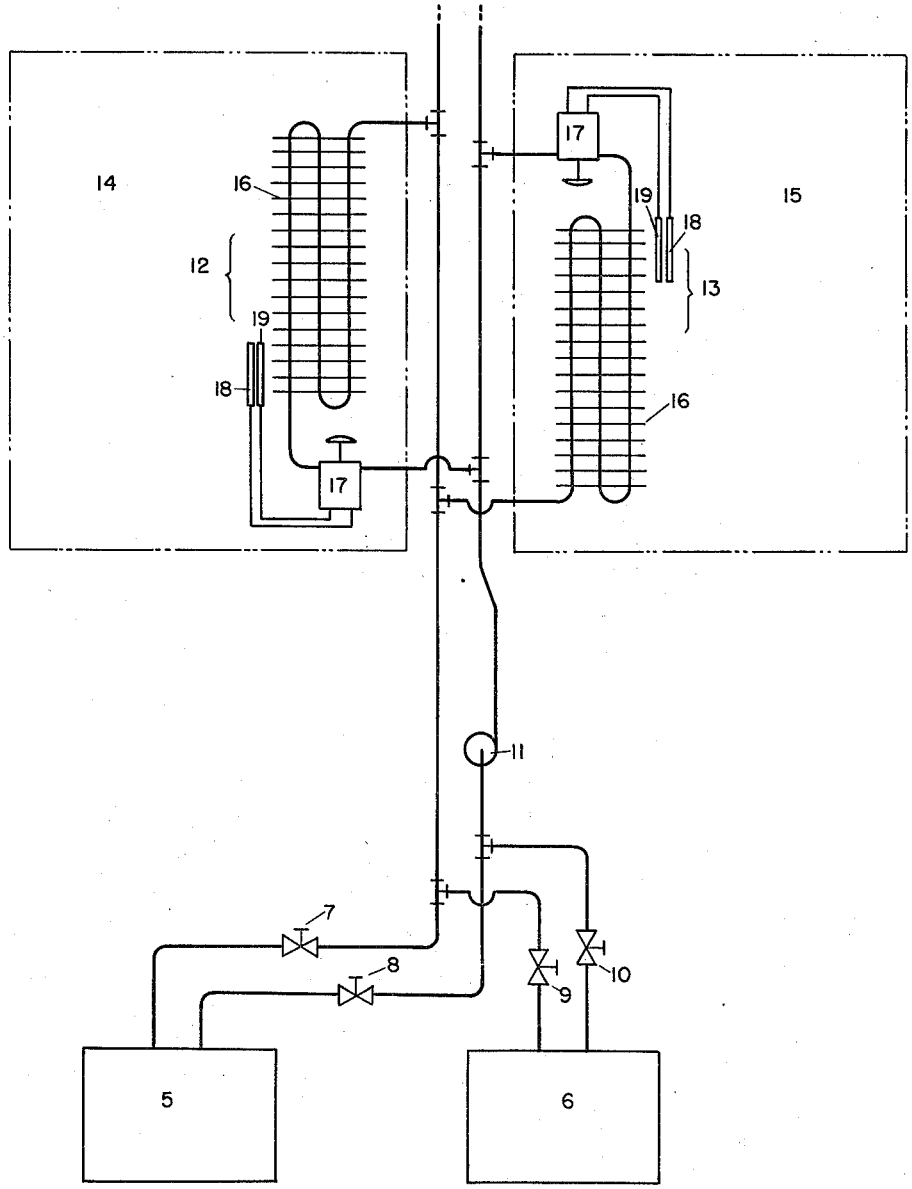
Fig. 1 is a diagrammatic illustration of an air conditioning system including a plurality of units to which hot and cold water may be supplied under winter and summer operating conditions.

Considering the drawings similar designations referring to similar parts, numeral 5 designates a source of heated water and numeral 6 represents a source of cooled water. The heating and refrigeration systems usually employed for providing water at desired elevated and reduced temperatures are not illustrated since they form no part of the invention. Under winter operating conditions, hot water valves 7 and 8 will be opened and cold water valves 9 and 10 closed, whereas the reverse will take place under summer operating conditions. Pump 11 supplies the hot or cold water, as the case may be, to air conditioning units 12 and 13 serving respectively rooms or similar enclosed areas 14 and 15. As will be understood the system is not limited to any number of units and is normally employed in office buildings, hotels and similar buildings having a great number of rooms of different size.

Units 12 and 13 are shown diagrammatically and it will be understood that in practice they are suitably housed in casings and may contain more comprehensive assemblies than those illustrated. Since the invention relates more particularly to the control of hot and cold liquids to the heat exchange elements of such units, only the essential parts have been included in illustrating the unit. These are coils 16, regulating valve 17 and bulbs 18 and 19.

Figure 2:
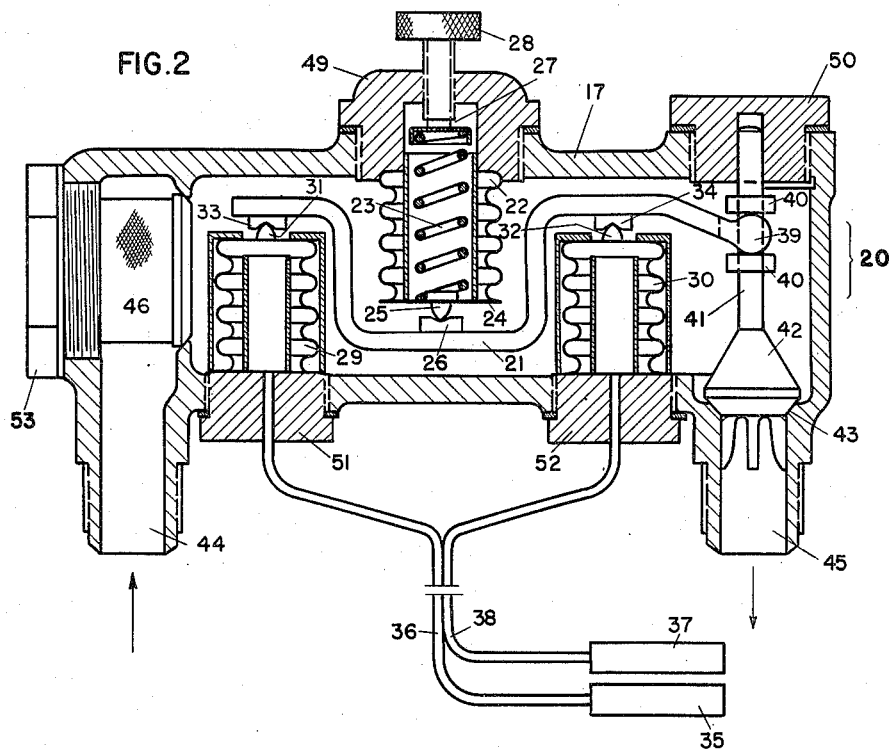
Fig. 2 illustrates a valve employed for metering hot and cold liquid to a unit of the type employed in the system exemplified in Fig. 1.

Considering the system for regulating automatically the flow of heated or cooled fluid to the units, and with particular reference to Fig. 2, numeral 20 generally represents a valve housing. Within the housing is a free floating lever 21 biased in one direction by a seal-off bellows 22 and adjustment spring 23. At the bottom of bellows 22 is plate 24 mounting pivot 25 fitting within pivot receiving element 26 affixed to lever 21. The tension of spring 23 may be regulated by adjustment screw 27 operated by thumb nut 28.

The lever is biased in the opposite direction by two vapor filled thermal systems which terminate in bellows 29 and 30, engaging the lever by means of pivots 31 and 32 contacting pivot receiving elements 33 and 34 as shown.

By "thermal system" is meant the combination of bellows, thermal bulb, and connecting tubing, filled with a volatile fluid, partly liquid and partly gaseous, with the pressure in the bellows determined by the temperature of the surface of the liquid in the system. In the arrangement of Fig. 2 the left hand thermal system is charged by the method known as "gas charging" or "fade out filling." This means that said system is substantially filled with a vapor except that a small volume of liquid is retained in the control bulb. The pressure in the system is here too determined by the temperature of the surface of the liquid.

The right hand thermal system of Fig. 2 makes use of what is known as a "heavy fill." This means that the right hand system is charged with the same fluid as in the left hand system except that it is present in the liquid state with a relatively small volume in gaseous state (which might be termed a "bubble") in the control bulb.

The left hand system embraces control bulb 35 and tubing 36 connecting the bulb to bellows 29, whereas the right hand system includes control bulb 37 connected by tubing 38 to bellows 30.

The lever 21 terminates at its operating end in actuating fork 39 positioned between holding elements 40 and straddling valve stem 41 to cause it to actuate valve 42. Upon an upward movement of the valve, it will uncover seat 43 to permit liquid entering the valve at intake 44 to flow through the valve and be discharged through outlet 45 whereas a downward movement of the stem tends to close the valve.

Under winter operating conditions cold water valves 9 and 10 will be shut and hot water valves 7 and 8 will be open. Heated water from source 5 will be pumped to the respective valves 17 serving their associated coils 16.

Figure 3:
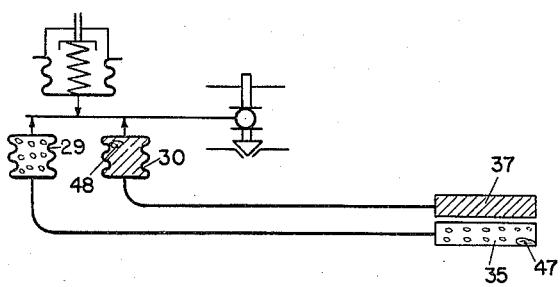
Fig. 3 shows diagrammatically the bulb and bellows arrangement employed with applicant's valve under winter operating conditions.

The heated water entering intake 44 passes through strainer 46 and then flows in contact with bellows 29 and 30 in its course to valve 42. The operation which takes place under such conditions, when heating is required, is illustrated in Fig. 3. Bulb 37 is subjected to the temperature of the room in which it is located. The room temperature, under winter operating conditions, is lower than the water temperature contacting bellows 30. The pressure in the bellows will be the pressure corresponding to the water temperature, inasmuch as the bellows will substantially immediately attain the temperature of the water. Since the bulb is subjected to the air of the room at lower temperature, the gas bubble 48 will be in the bellows 30. The bellows will be expanded with pivot 32 pressing against receiving element 34, and the bellows will remain fixed in such expanded position as long as the water temperature affecting bellows 30 is higher than the room temperature to which bulb 37 is subjected. In effect, the right hand thermal system will thus become fixed with constant pressure exerted by pivot 32 upwardly against the lever at pivot receiving element 34.

The spring 23 is adjusted to balance the force exerted by bellows 30 when the pressure therein corresponds to the temperature to be maintained in the room. Therefore, the pressure exerted by bellows 30 under normal winter operating conditions is well above the control point set by the spring.

The pressure in the left hand thermal system is determined by the liquid 47 which, under winter operating conditions, remains in control bulb 35. This is because the heated water assures retention of the gaseous state in bellows 29 and the drop of liquid 47 thus locates in the bulb subjected to the cooler room temperature. As the temperature in the room changes, the temperature of the surface of the liquid 47 will change and the pressure in the left hand thermal system will correspondingly change. As the pressure in the left hand thermal system rises responsive to a rise in temperature in the room, the bellows 29 will exert an upward force on the lever at point 33, in opposition to the adjustment spring, and the upward movement of the lever causes valve 42 to tend to close. On the contrary, if the valve is closed or nearly closed and more heating is required, the bellows 29 will tend to contract causing the lever 21 to move downwardly at point 33 with the result that valve 42 will tend to open, with consequent increase in heating effect.

Figure 4:
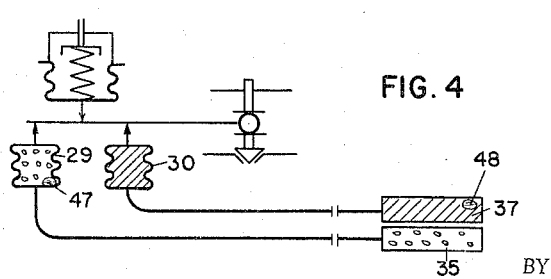
Fig. 4 shows diagrammatically the bulb and bellows arrangement employed with applicant's valve under summer operating conditions.

Under summer operating conditions, the reverse action takes place. Valves 9 and 10 are then open and 7 and 8 closed. Cooled water is then pumped to valves 17 and the control operation is as illustrated in Fig. 4. Since the temperature of the cold water is lower than the room temperature affecting the bulbs, the liquid 47 in the left hand thermal system will locate in the bellows 29 since the temperature of the bellows is lower than that of the atmosphere surrounding the bulb 35. This condition will persist so long as the temperature of the water contacting bellows 29 is colder than that of the air surrounding bulb 35. As a result, bellows 29 will remain in fixed contracted position so long as such cold water is on, since the pressure in the bellows corresponding to the cold water temperature is well below the control point as set by spring 23. The right hand or heavy fill thermal system will be controlled from bulb 37 since the temperature at the bulb is higher than in bellows 30 and the gas bubble 48 will therefore remain in the bulb. As the temperature in the room changes, it will cause a corresponding change in pressure in the right hand thermal system to govern the expansion and contraction of bellows 30. As a result, when the bulb temperature rises, when further cooling in the room is required, there will be an increase in pressure causing bellows 30 to expand and push lever 21 upwardly at point 34 against the pressure of adjustment spring 23. This will cause a greater amount of cooled liquid to flow through the valve with consequent increase in cooling effect. When the temperature in the room cools down to the point where less cooling fluid is required, the bulb temperature will fall with the result that the bellows 30 will correspondingly contract to cause the valve to tend to move downwardly to restrict the flow of cooled liquid.

Thus, applicant has provided a system of liquid flow control through a valve so that responsive to variations in room temperature affecting a pair of bulbs, the valve will open in response to a rise in room temperature when the liquid temperature is below room temperature, and close on a rise in a room temperature when the water temperature is above room temperature. This change over in valve operation takes place automatically responsive only to differences in temperature in water or other fluid sent through the valve.

The area of the seal-off bellows 22 is twice the area of either of the control bellows 29, 30 and the distance between pivots 31 and 25 is equal to the distance between 25 and 32. Therefore, changes in hydrostatic pressure on the system will not affect the relative control points. The moment of force due to a change in the hydrostatic pressure when using either of the control bellows 29, 30 as a pivot (as when a bellows is expanded or contracted in fixed position as before described) will be the same in one direction as in the other for any given change in hydrostatic pressure.

The valve is constructed so that removable caps 49, 50, 51, 52 and strainer cap 53 may easily be connected and disconnected, for inspection, repair and replacement of parts.

Although only one valve port is used, the system accurately meters the required amount of heated or cooled liquid regardless of seasonal requirements and responsive to variations in load. Since the control bellows 29, 30 are always in the path of the liquid supply to the valve, they will quickly respond to a change in the temperature of the liquid and give sensitive control.

Since the invention exemplified by the system disclosed may be practiced with modifications in design of apparatus as well as in the method of operation employed, obvious variations are intended to be covered, and the terms of the appended claims are not intended to be limited to the specific combinations and steps employed.

I claim:

1. A control arrangement for an air conditioning system comprising a valve structure, a lever within the structure, three pivot receiving elements on the lever, a seal-off bellows and adjusting spring for exerting pressure upon a pivot contacting one of said pivot receiving elements, a first thermal sensitive system having a first bellows positioning a pivot against a second of said receiving elements, a second thermal sensitive system having a second bellows for positioning a pivot against the third of said pivot receiving elements, means for passing heated or cooled fluid through the structure, said thermal sensitive systems being filled with gas and liquid so that under winter operating conditions, one of the bellows will be expanded and stay expanded so long as the temperature of the fluid is above a certain point, the second bellows of said second thermal sensitive system remaining in fixed contracted position when fluid flowing through the structure is below a certain temperature, a valve actuated by the lever, and a bulb for each of said thermal sensitive systems located in the atmosphere served by an air conditioning unit to which said fluid is routed.

2. In a system of the character described a room to be conditioned, an air conditioning unit within the room, a valve arrangement for metering the fluid to the unit, said valve arrangement including a housing, a plurality of thermal sensitive systems serving said valve arrangement, said thermal sensitive systems including bellows located within the housing and bulbs located within the room, one of said systems being gas charged and the other being heavy filled, a lever within the housing biased in one direction by said bellows, and in another direction by a pressure exerting element, a valve disposed in said housing regulated by said lever, said bellows upon the admission of cooled fluid to the housing operating said lever so that the valve will open in response to a rise in room temperature and, upon the admission of heated fluid to the housing, operating said lever so that the valve will close in response to a rise in room temperature.

3. In a system of the character described, a room to be conditioned, an air conditioning unit for heating or cooling the atmosphere of said room, a valve arrangement for metering liquid delivered to the unit, said arrangement including housing having a valve port therein, means for delivering liquid in varying quantity through the valve port, a lever in said housing for actuating a valve serving the port, a seal-off bellows in said housing biasing said lever in one direction, a plurality of bellows in said housing biasing the lever in the opposite direction, the area of said seal-off bellows being twice the area of either of said other bellows, a bulb and connecting tubing serving each of said bellows, the combination of bellows, connecting tubing and bulb being a thermal sensitive system, one of said thermal sensitive systems being gas charged, the other of said thermal sensitive systems being heavy filled, said control bellows of said thermal sensitive systems operating responsive to the temperature of fluid flowing in contact with the bellows, and responsive to the temperature of air in the room to which said bellows are subjected, whereby fluid of desired temperature is metered in required volume to an air conditioning unit for maintaining the temperature of the air within prescribed limits.

4. In a system of the character described, a room to be conditioned, an air conditioning unit disposed in said room for tempering the air therein, a valve structure for metering fluid delivered to said unit, said valve structure including a housing, a free floating lever in said housing, a first thermal sensitive system including a bellows disposed within the housing, a second thermal sensitive system including a bellows disposed within the housing, one of said systems being gas charged and another of said systems being heavy filled, said bellows biasing said lever in one direction, a third bellows in the housing biasing said lever in the opposite direction, said free floating lever being controlled by said bellows, said housing having a port therein, a valve for closing said port, said valve being actuated by said lever, and said thermal sensitive systems cooperating in response to air conditions in the room and to the temperature of the fluid contacting said bellows to actuate said lever to regulate the volume of fluid admitted to the air conditioning unit through said valve port, said systems upon the admission of cooled fluid to the housing actuating said lever to open said valve upon a rise in room temperature and upon the admission of heated fluid to the housing actuating said lever to close said valve upon a rise in room temperature.

5. In a system of the character described, a space to be conditioned; an air conditioning unit within said space; a valve for metering fluid to said unit, said valve including a housing having a passage therethrough, a closure member closing said passage, and a lever disposed in said housing, said lever serving to actuate said member; means adapted to dispose the lever in one position upon the admission of heated fluid to the housing and in a second position upon the admission of cooled fluid to the housing, said means including a first thermal sensitive system having a bellows disposed in said housing to control movement of said lever and a bulb disposed within the space to be conditioned, and a second thermal sensitive system having a bellows disposed within said housing to control movement of said lever and a bulb disposed within the space to be conditioned, one of said thermal sensitive systems being gas charged and another of said thermal sensitive systems being heavy filled so that upon the admission of cooled fluid to the housing the passage is opened in response to a rise in space temperature while upon the admission of heated fluid to the housing the passage is closed in response to a rise in space temperature.

6. In a system of the character described, a space to be conditioned; an air conditioning unit within said space; a valve for metering fluid to said unit, said valve including a housing having a port therein, a closure member closing said port, a second member adapted to move said closure to open and to close said port, an element operative upon the admission of heated fluid to the housing to cause said second member to assume one position and operative upon the admission of cooled fluid to the housing to cause said second member to assume a different position, and a second element operative responsive to variations in condition of the conditioned space for governing the action of said second member to vary the position of said closure member, one of said elements being gas charged and another being heavy filled, said first element being adapted to cooperate with said second element upon the admission of heated fluid to the housing to actuate said second member to move the closure member progressively in one direction when the conditioned space tends to drop in temperature and progressively in the opposite direction when the conditioned space tends to rise in temperature, whereas reverse operations of the closure member will take place when cooled fluid is admitted to the housing.

7. In a system of fluid flow control, a valve structure including a housing, a first thermal sensitive system having a bellows within the housing, a second thermal sensitive system having a bellows within the housing, a pressure exerting element in the housing, a lever disposed in said housing controlled by said bellows and said pressure exerting element, one of said thermal sensitive systems being gas charged and the other being heavy filled whereby, in response to the temperature of fluid flowing through the housing, one of said bellows is expanded under certain operating conditions and the other of said bellows is contracted under other operating conditions depending upon the temperature of fluid flowing through the housing, and a valve controlled by the lever, said thermal sensitive systems upon the admission of cooled fluid to the housing governing the action of said valve so that the valve will open in response to a rise in temperature of a room conditioned by a unit to which fluid from the housing is admitted and, upon the admission of heated fluid to the housing, governing the action of said valve so that the valve will close in response to a rise in room temperature.

8. In a valve structure of the character described, a housing, a lever disposed in said housing, a valve member controlled by said lever, a first bellows member in said housing bearing against a first pivot point on the lever, a second bellows member in said housing bearing against a second pivot point on the lever, means for biasing the lever, a first thermal sensitive system including said first bellows member, and a second thermal sensitive system including said second bellows member, one of said thermal sensitive systems being gas charged and the other being heavy filled whereby in response to the temperature of fluid flowing through the housing one of said bellows is expanded under certain operating conditions and the other of said bellows is contracted under other operating conditions to actuate said lever, said systems, upon the admission of cooled fluid to the housing, governing the action of said lever so that the valve will open in response to a rise in temperature of a room conditioned by a unit to which fluid from the housing is admitted and, upon the admission of heated fluid to the housing, governing the action of said lever so that the valve will close in response to a rise in room temperature, said bellows members having areas sized in such manner that said lever will function in the same manner responsive to variations in conditions of the bellows members regardless of changes in hydrostatic pressure of the fluid passing through the valve structure.

9. A temperature responsive valve comprising a valve casing having a port, a valve member controlling said port, a thermostatic power element responsive to temperature external of said casing, means to transmit movement from said power element to said valve member and including a lever and thrust means, and means including a thermostatic power element responsive to temperature of the fluid supplied to said casing and cooperable with said transmitting means to determine the direction of valve member movement by and upon temperature increase of said first named power element.

10. In apparatus for controlling the flow of temperature changing medium to a space wherein said medium may be either heated or cooled, closure means, a first thermostatic means including a bulb and a bellows, said thermostatic means being charged with a volatile liquid fill of such quantity that all of said liquid may be contained in either the bulb or the bellows, a second thermostatic means including a bulb and a bellows and charged with a volatile fluid in such quantity that neither the bulb nor the bellows can contain all of said liquid, stop means for limiting the contraction of said first bellows and the expansion of said second bellows, means connecting both of said bellows in operative relation to said closure, means positioning both of said bellows in heat exchange relation with the medium the flow of which is to be controlled, and means positioning both of said bulbs in heat exchange relation with the medium in said space.

11. In a flow control device, for a temperature changing medium, a movable flow controlling member, temperature responsive means for controlling the movement of said member, said temperature responsive means comprising a first bulb and bellows assembly containing a high pressure fill of volatile fluid and a second bulb and bellows assembly containing a fade-out fill of volatile fluid, the bulbs of said temperature responsive means being arranged to respond to space temperature and said bellows being exposed to said medium, abutment means for limiting the expansion of the first assembly and further abutment means for limiting the contraction of the second assembly, and motion transmitting means connecting both of said assemblies in operative relation to said member.

12. In a device for controlling the delivery of a heated or cooled conditioning medium to a space, comprising a closure member, thermostatic apparatus for operating said member, said apparatus including a first bulb-bellows arrangement having a fill of volatile liquid in such quantity that there is more than sufficient liquid to fill either the bulb or bellows but not both and a second bulb-bellows arrangement having a fade-out fill of volatile liquid in such quantity that either the bulb or bellows can contain the entire amount of liquid of the fill, a stop limiting the contraction of the fade-out fill bellows, a stop limiting the expansion of the first-named bellows, and means including a lever having a pair of spaced pivots for operatively connecting both of said bellows to said member, said pivots and said stops cooperating in a manner to cause said lever to be fulcrumed about one of said pivots and operated through the other of said pivots.

13. An actuator mechanism adapted to be disposed within a conduit for operating a device for controlling flow through said conduit, said mechanism including a floating operating lever, temperature responsive means for controlling the movement of said lever, said temperature responsive means comprising a first bulb and bellows assembly containing a high pressure fill of volatile fluid and a second bulb and bellows assembly containing a fade-out fill of volatile fluid, the bulbs of both of said assemblies being constructed and arranged for disposal outside of said conduit for responding to space temperature and the bellows of both of said assemblies being arranged adjacent said lever for responding to temperature of medium flowing through the conduit, spaced pivot means, both of said bellows engaging said lever through said spaced pivot means, and abutment means for limiting the contraction of the bellows of the fade-out fill assembly and for limiting the expansion of the bellows of the high pressure fill assembly.

14. In a control device, a support member, a pair of spaced apart bellows means attached to said support member, an operating lever, pivot means arranged between each of said bellows and said lever, a bulb connected by tube means to one of said bellows to form a first thermostatic bulb-bellows assembly, a second bulb connected by tube means to the other of said bellows to form a second thermostatic bulb-bellows assembly, the bulbs of both assemblies responding to temperature in a space to be conditioned, the bellows of both assemblies being responsive to temperature of medium passing adjacent the support member, said first assembly being charged with a high pressure fill of volatile fluid and said second assembly being charged with a fade-out fill of volatile fluid, and abutment means attached to said support member for limiting the contraction of the bellows of the fade-out fill assembly and limiting the expansion of the bellows of the high pressure fill assembly.

WILLIAM L. McGRATH.

REFERENCES CITED

The following references are of record in the file of this patent:

UNITED STATES PATENTS

| Number | Name | Date |
|---|---|---|
| 1,795,860 | Jaeger | Mar. 10, 1931 |
| 1,958,814 | Carson, Jr. | May 15, 1934 |
| 2,112,344 | Otto | Mar. 29, 1938 |
| 2,154,030 | Brumbaugh | Apr. 11, 1939 |
| 2,230,056 | Hill | Jan. 28, 1941 |
| 2,342,328 | Carrier | Feb. 22, 1944 |